US012795028B2

(12) United States Patent
Shinba

(10) Patent No.: US 12,795,028 B2
(45) Date of Patent: Nov. 10, 2026

(54) POWER SUPPLY DEVICE AND IMAGE PROCESSING APPARATUS

(71) Applicant: KYOCERA Document Solutions Inc., Osaka (JP)

(72) Inventor: Minoru Shinba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 294 days.

(21) Appl. No.: 18/772,929

(22) Filed: Jul. 15, 2024

(65) Prior Publication Data

US 2025/0047797 A1 Feb. 6, 2025

(30) Foreign Application Priority Data

Aug. 3, 2023 (JP) ................................ 2023-126993

(51) Int. Cl.
*H04N 1/00* (2006.01)

(52) U.S. Cl.
CPC .............................. *H04N 1/00904* (2013.01)

(58) Field of Classification Search
CPC ................................................ H04N 1/00904
See application file for complete search history.

(56) References Cited

U.S. PATENT DOCUMENTS

2019/0097535 A1* 3/2019 Otsuka .................... H02M 1/08

FOREIGN PATENT DOCUMENTS

JP 2017032730 A 2/2017

* cited by examiner

*Primary Examiner* — Christopher Wait
(74) *Attorney, Agent, or Firm* — Alleman Hall LLP

(57) ABSTRACT

A power supply device includes a signal generation portion, a voltage generation portion, and a correction portion. The signal generation portion generates a PWM signal. In the voltage generation portion, an output voltage value is adjusted according to the PWM signal. The correction portion finds a correction value for a duty ratio corresponding to a frequency or a period of the PWM signal, and corrects the duty ratio of the PWM signal based on the correction value.

5 Claims, 6 Drawing Sheets

POWER SUPPLY DEVICE AND IMAGE PROCESSING APPARATUS

INCORPORATION BY REFERENCE

This application is based upon and claims the benefit of priority from the corresponding Japanese Patent Application No. 2023-126993 filed on Aug. 3, 2023, the entire contents of which are incorporated herein by reference.

The present disclosure relates to a power supply device and an Image processing apparatus.

BACKGROUND

As related art, an image processing apparatus (image forming apparatus) that incorporates parts such as a developing roller that require high voltage, and is configured such that a high voltage output circuit of a power supply device (high voltage board) applies a predetermined high voltage to such a part is known. In a power supply device of the related art, a voltage generation portion (high voltage output circuit) generates a high voltage corresponding to a duty ratio of a PWM signal (rectangular signal) input from a signal generation portion (control board).

In the related art described above, the signal generation portion includes a controller that outputs a rectangular control signal, and a driver circuit that generates a PWM signal in response to a level change of the rectangular control signal and outputs the PWM signal to the voltage generation portion. The controller measures the duty of the PWM signal, specifies the difference between the duty of the rectangular control signal and the duty of the PWM signal, and corrects the duty of the rectangular control signal based on the specified difference.

SUMMARY

A power supply device according to an aspect of the present disclosure includes a signal generation portion, a voltage generation portion, and a correction portion. The signal generation portion generates a PWM signal. In the voltage generation portion, an output voltage value is adjusted according to the PWM signal. The correction portion finds a correction value for a duty ratio corresponding to a frequency or a period of the PWM signal, and corrects the duty ratio of the PWM signal based on the correction value.

An image processing apparatus according to another aspect of the present disclosure includes the power supply device, and a main body including an image processing function.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the accompanying drawings. The following embodiments are examples of embodying a technique according to the present disclosure, and are not intended to limit the technical scope of the present disclosure.

Embodiment 1

[1] Overall Configuration of Image Processing Apparatus

First, an overall configuration of an image processing apparatus 10 according to the present embodiment will be described with reference to FIGS. 1 and 2.

The image processing apparatus 10 according to the present embodiment is, for example, a multifunction peripheral having multiple functions such as a scanning function to acquire image data from a document, a printing function to form an image based on the image data, a facsimile function, and a copying function. The image processing apparatus 10 only needs to have an image processing function including at least one of a function of forming an image and a function of acquiring image data, and may be a printer, a scanner, a facsimile device, a copy machine, or the like.

Figure 1:
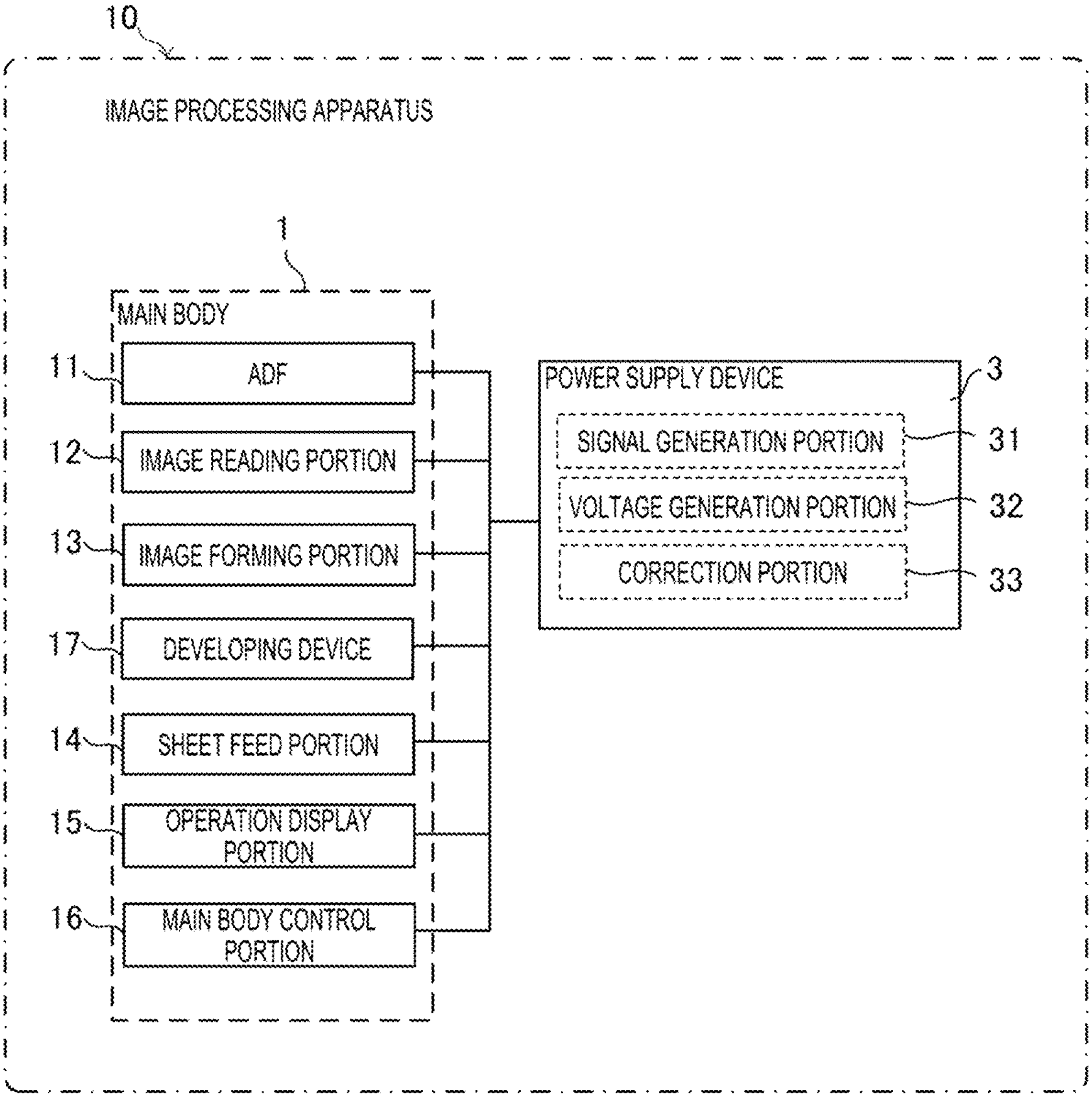
FIG. 1 is a schematic block diagram of an image processing apparatus according to a first embodiment.
Figure 2:
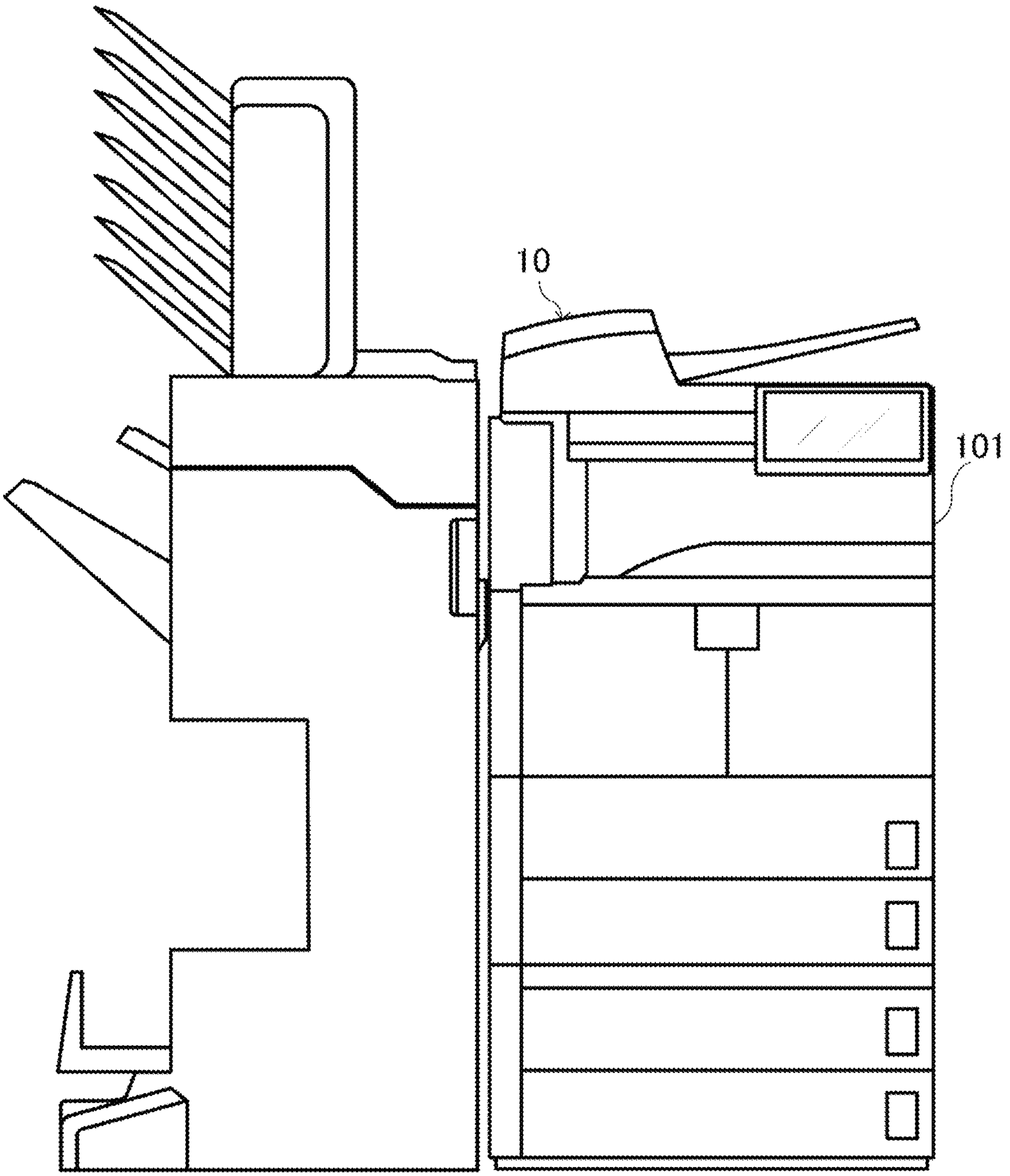
FIG. 2 is a schematic diagram showing an appearance of an image processing apparatus according to a first embodiment.

As shown in FIG. 1, the image processing apparatus 10 includes an automatic document conveying device 11, an image reading portion 12, an image forming portion 13, a developing device 17, a sheet feed portion 14, an operation display portion 15, a main body control portion 16 and a power supply device 3. The automatic document conveying device 11 is an auto document feeder (ADF), and thus is expressed as "ADF" in FIG. 1, and will also be referred to as "ADF 11" in the following description. In the present embodiment, as shown in FIG. 2, the image processing apparatus 10 includes a housing 101. The ADF 11, the image reading portion 12, the image forming portion 13, the developing device 17, the sheet feed portion 14, the operation display portion 15, the main body control portion 16, and the power supply device 3 are provided in the housing 101.

The image processing apparatus 10 includes a main body 1 having an image processing function. The ADF 11, the image reading portion 12, the image forming portion 13, the developing device 17, the sheet feed portion 14, the operation display portion 15, and the main body control portion 16 are provided in the main body 1. In other words, the image processing apparatus 10 includes the main body 1 having an image processing function, and a power supply device 3.

The ADF 11 conveys a document whose image is to be read by the image reading portion 12. The ADF 11 includes a document setting portion, a plurality of conveying rollers, a document holder, a sheet discharge portion, and the like.

The image reading portion 12 reads an image from a document and outputs image data corresponding to the read image. The image reading portion 12 includes a document table, a light source, a plurality of mirrors, an optical lens, a charge coupled device (CCD), and the like.

The image forming portion 13 forms an image on a sheet using an electrophotographic method based on the image data output from the image reading portion 12. In addition, the image forming portion 13 forms an image on a sheet based on image data input from an information processing apparatus such as a personal computer that is outside the image processing apparatus 10.

The image forming portion 13 includes: four image forming units corresponding to four colors: cyan (C), magenta (M), yellow (Y), and black (B); a laser scanning unit; an intermediate transfer belt; a secondary transfer roller; a fixing device, and the like. Each image forming unit includes a photoconductor drum, a charging roller, a primary transfer roller, a drum cleaning portion, and the like. The image forming portion 13 may be configured to form an image on the sheet using an image forming method other than the electrophotographic method, such as an inkjet method, for example.

The image forming portion 13 forms an image on a sheet using toner as a developing agent. In a case in which the image forming portion 13 forms an image using an inkjet method, ink (another example of a developing agent) is supplied instead of toner. The toner supplied to the image forming portion 13 includes, for example, toners of multiple colors: cyan (C), magenta (M), yellow (Y), and black (K). The sheet after image formation in the image forming portion 13 is discharged (supplied) to an expansion device or the like for post-processing.

The developing device 17 executes a developing process to develop the electrostatic latent image formed on the surface of the photoconductor drum of the image forming portion 13. Particularly in the present embodiment, the developing device 17 performs development using a two-component developing agent including toner and a carrier. The developing device 17 has four developing units corresponding to the four image forming units. Each developing unit includes a developing roller, a magnet roller, and the like.

The sheet feed portion 14 supplies a sheet to the image forming portion 13. The sheet feed portion 14 includes a sheet feed cassette, a manual feed tray, a sheet conveying path, a plurality of conveying rollers, and the like. The image forming portion 13 forms an image on a sheet supplied from the sheet feed portion 14. The sheet supplied to the image forming portion 13 is, for example, paper, but is not limited to paper, and may be, for example, a resin film or the like.

The operation display portion 15 is a user interface in the image processing apparatus 10. The operation display portion 15 includes a display portion such as a liquid crystal display that displays various types of information according to control instructions from a control portion of the main body, and an operation portion such as switches or a touch panel for inputting various types of information to the control portion of the main body according to a user's operation. In addition, the image processing apparatus 10 may include, for example, an audio output portion, an audio input portion, and the like as a user interface in addition to or in place of the operation display portion 15.

The main body control portion 16 has a main configuration of a computer system having one or more processors and one or more memories, and performs overall control of the image processing apparatus 10. In the image processing apparatus 10, functions of the main body control portion 16 are achieved by one or more processors executing programs. In the present embodiment, as an example, the main body control portion 16 includes a central processing unit (CPU).

The power supply device 3, for example, independently applies a relatively high voltage (high voltage) to high-voltage drive parts such as a developing roller of the developing device 17, a charging roller and a transfer roller of the image forming portion 13, and the like. That is, the power supply device 3 is a device that outputs electric power for operating the high-voltage drive parts of the image processing apparatus 10. In the present embodiment, the power supply device 3 includes a signal generation portion 31 and a voltage generation portion 32.

Figure 4:
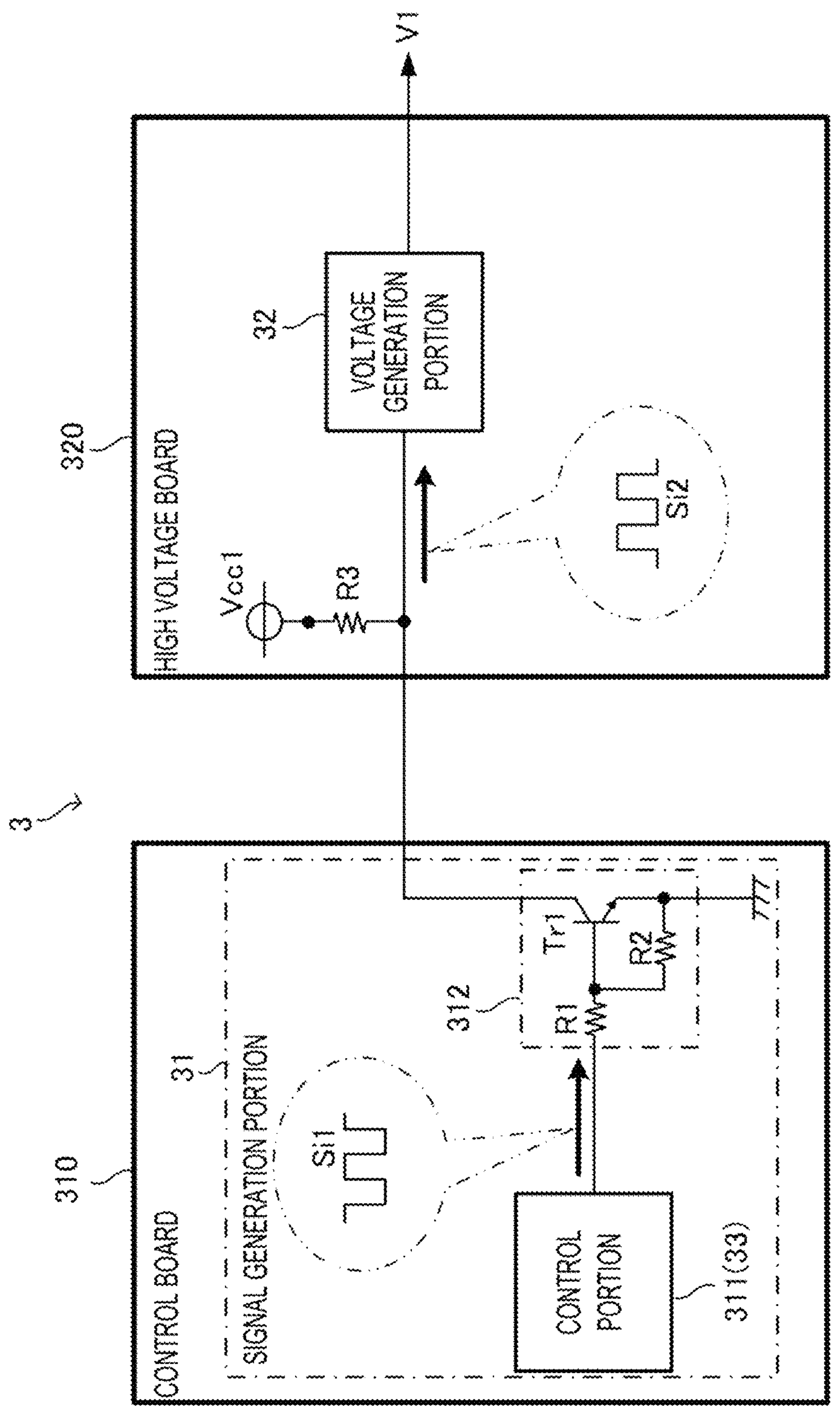
FIG. 4 is a schematic circuit diagram showing an example of a power supply device of an image processing apparatus according to a first embodiment.

The signal generation portion 31 generates a PWM signal Si2 (see FIG. 4). The "PWM signal" referred to here is a rectangular wave signal used for pulse width modulation (PWM) control. In other words, the PWM signal Si2 is a rectangular signal that alternately repeats high (H) level and low (L) level, where the sum of a H level time width T21 (see FIG. 5) and a L level time width is one period T20 (see FIG. 5).

The PWM signal Si2 enables PWM control by adjusting a duty ratio thereof. The "duty ratio" referred to here means a ratio occupied by a H level period in the PWM signal Si2, and is expressed by dividing the H level time width T21 by the period T20 (=T21/T20).

The voltage generator 32 generates a desired output voltage V1 (see FIG. 4). The output voltage V1 (high voltage) generated by the voltage generation portion 32 is applied independently to high voltage drive parts such as the developing roller, the charging roller, and the transfer roller. Here, the voltage generation portion 32 can adjust the output voltage value (the magnitude of the output voltage V1) according to the PWM signal Si2 generated by the signal generation portion 31.

In this way, the power supply device 3 according to the present embodiment constitutes the image processing apparatus 10 together with the main body 1 of the image processing device 10. In other words, the image processing apparatus 10 according to the present embodiment includes the power supply device 3 and the main body 1 having an image processing function.

In addition, the image processing apparatus 10 further includes a storage portion, a communication portion, and the like. The storage portion includes one or more nonvolatile memories, and stores in advance information such as control programs for causing the main body control portion 16 to execute various types of processes. The communication portion is an interface that executes data communication between the image processing apparatus 10 and, for example, an external device connected via a communication network such as the Internet or a local area network (LAN).

As related art, an image processing apparatus (image forming apparatus) that incorporates parts such as a developing roller that require high voltage, and is configured such that a high voltage output circuit of a power supply device (high voltage board) applies a predetermined high voltage to such a part is known. In a power supply device of the related art, a voltage generation portion (high voltage output circuit) generates a high voltage corresponding to a duty ratio of a PWM signal (rectangular signal) input from a signal generation portion (control board).

In the related art described above, the signal generation portion includes a controller that outputs a rectangular control signal, and a driver circuit that generates a PWM signal in response to a level change of the rectangular control signal and outputs the PWM signal to the voltage generation portion. The controller measures the duty of the PWM signal, specifies the difference between the duty of the rectangular control signal and the duty of the PWM signal, and corrects the duty of the rectangular control signal based on the specified difference.

However, the power supply device according to the related technology requires a circuit for measuring the duty of the PWM signal, and therefore it is difficult to simplify the configuration and control of the power supply device.

However, the present embodiment provides a power supply device 3 and an image processing apparatus 10 whose configuration and control can be easily simplified by the configuration described below.

[2] Details of Power Supply Device

Next, with reference to FIGS. 1 and 3 to 5, the configuration of the power supply device 3 that independently applies an output voltage V1 to high-voltage drive parts (such as the developing roller, charging roller, and transfer roller) will be described in detail.

The power supply device 3 according to the present embodiment, as shown in FIG. 1, includes a correction portion 33 in addition to the signal generation portion 31 and the voltage generation portion 32. That is, the power supply device 3 includes the signal generation portion 31, the voltage generation portion 32, and the correction portion 33.

The voltage generation portion 32 of the power supply device 3 is configured to be able to adjust an output voltage value (magnitude of the output voltage V1) according to the PWM signal Si2 generated by the signal generation portion 31, and thus when the PWM signal Si2 changes, the magnitude of the output voltage V1 of the power supply device 3 changes. In other words, the magnitude of the output voltage V1 of the power supply device 3 is not constant, but is variable according to the duty ratio of the PWM signal Si2 generated by the signal generation portion 31.

Figure 3:
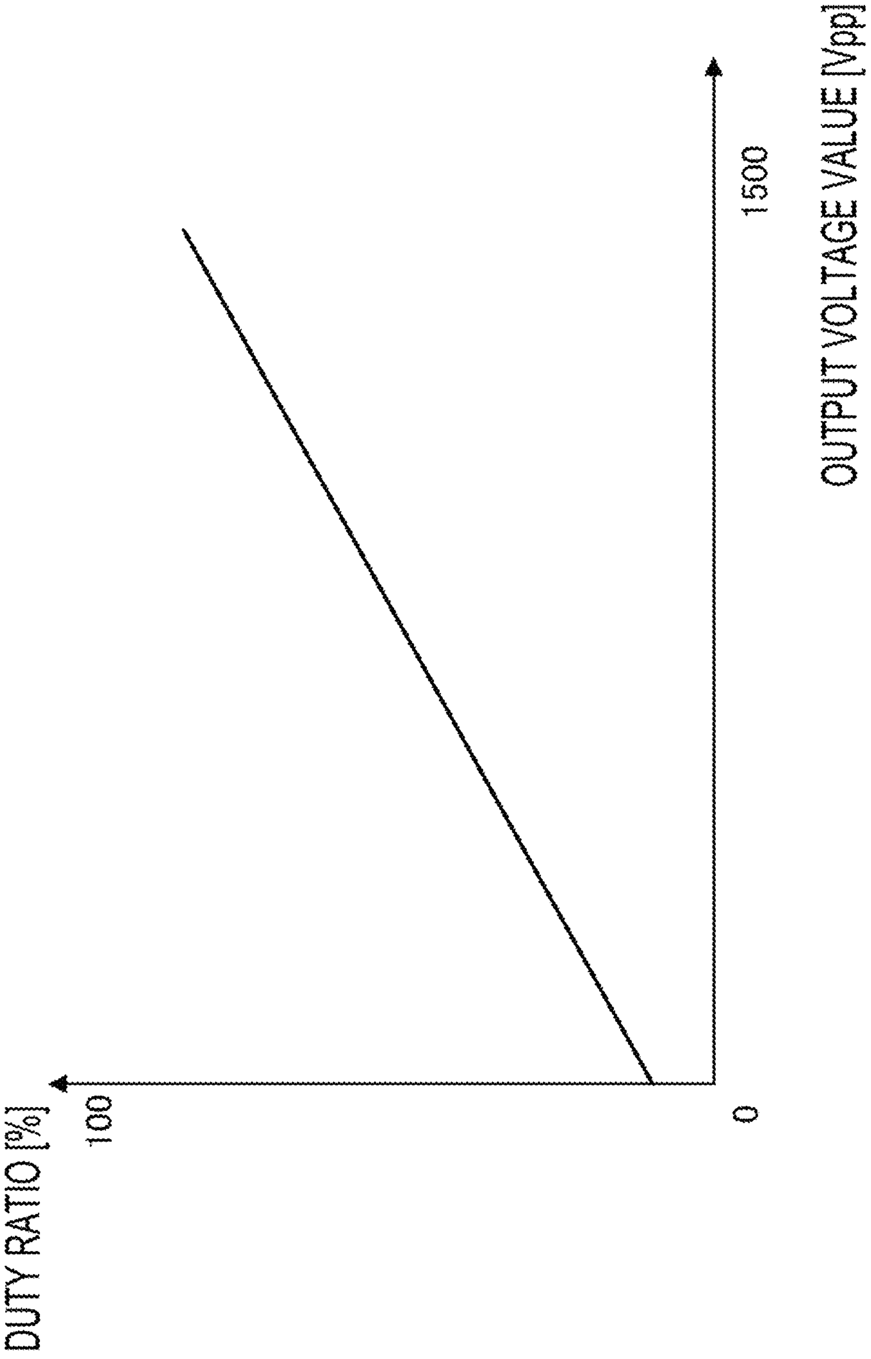
FIG. 3 is an explanatory diagram showing a relationship between an output voltage value and a duty ratio of a PWM signal in a power supply device of an image processing apparatus according to a first embodiment.

For example, as shown in FIG. 3, as the duty ratio increases (approaches 100%), the output voltage value increases. In the example of FIG. 3, the output voltage value increases approximately in proportion to the duty ratio, with an upper limit of 1500 V peak-to-peak. In the example of FIG. 3, the target duty ratio is expressed by the following equation 1 using a target output voltage value v1, a slope a and an intercept b (duty ratio when the output voltage value is 0) of the graph in FIG. 3.

$$\text{Duty ratio [\%]} = v1 \times a + b \qquad \text{(Equation 1)}$$

More specifically, in the present embodiment, the signal generation portion 31 and the voltage generation portion 32 are provided separately on a control board 310 and a high voltage board 320 as shown in FIG. 4. That is, the signal generation portion 31 is provided on the control board 310, and the voltage generation portion 32 is provided on the high voltage board 320. The control board 310 and the high voltage board 320 are electrically connected to each other. In other words, the power supply device 3 includes the control board 310 including the signal generation portion 31, and the high voltage board 320 including the voltage generation portion 32.

The signal generation portion 31 of the control board 310 includes, for example, a control portion 311 and a switch circuit 312. The switch circuit 312 is a circuit that can be controlled by an H-level or L-level digital signal input to a control terminal, and an example of the switch circuit 312 is a resistor-embedded transistor (a so-called digital transistor) that includes a switching element Tr1 made of a transistor, and resistors R1, R2.

The control portion 311 includes, for example, a processor such as a CPU, and outputs a rectangular wave drive signal Si1 for driving the switch circuit 312. Like the PWM signal Si2, the drive signal Si1 is a rectangular signal that alternates between H level and L level, and the sum of the time width of the H level and the time width T11 of the L level (see FIG. 5) is one period T10 (see FIG. 5). The output terminal of the control portion 311 for the drive signal Si1 is electrically connected to the switch circuit 312.

In the switch circuit 312, the base of the switching element Tr1 is electrically connected to an output terminal of the drive signal Si1 in the control portion 311 via a resistor R1. Furthermore, a resistor R2 is electrically connected between a base and emitter of the switching element Tr1. The emitter of the switching element Tr1 is connected to a circuit ground, and a collector of the switching element Tr1 is electrically connected to the high voltage board 320.

The high voltage board 320 includes, for example, the voltage generation portion 32, a constant voltage source Vcc1, and a resistor R3. The constant voltage source Vcc1 is a voltage source that generates a predetermined DC voltage.

The PWM signal Si2 is input to the voltage generation portion 32. That is, the collector of the switching element Tr1 is electrically connected to an input terminal of the PWM signal Si2 in the voltage generation portion 32. Furthermore, the constant voltage source Vcc1 is electrically connected to the input terminal of the PWM signal Si2 in the voltage generation portion 32 via a resistor R3.

Thus, while the switch circuit 312 (switching element Tr1 thereof) is OFF, an H-level PWM signal Si2 is input to the voltage generation portion 32, and while the switch circuit 312 (switching element Tr1 thereof) is ON, an L-level PWM signal Si2 is input to the voltage generation portion 32. Here, the switch circuit 312 is turned ON and OFF by a drive signal Si1 from the control portion 311, and is turned ON when the drive signal Si1 is at H level and turned OFF when the drive signal Si1 is at L level.

Therefore, according to the signal generation portion 31 having the above configuration, basically, the PWM signal Si2, which is an inverted form of the drive signal Si1 in terms of H and L levels, is input to the voltage generation portion 32. That is, as shown in FIG. 5, while the drive signal Si1 is at H level, the PWM signal Si2 is at L level, and while the drive signal Si1 is at L level, the PWM signal Si2 is at H level.

Figure 5:
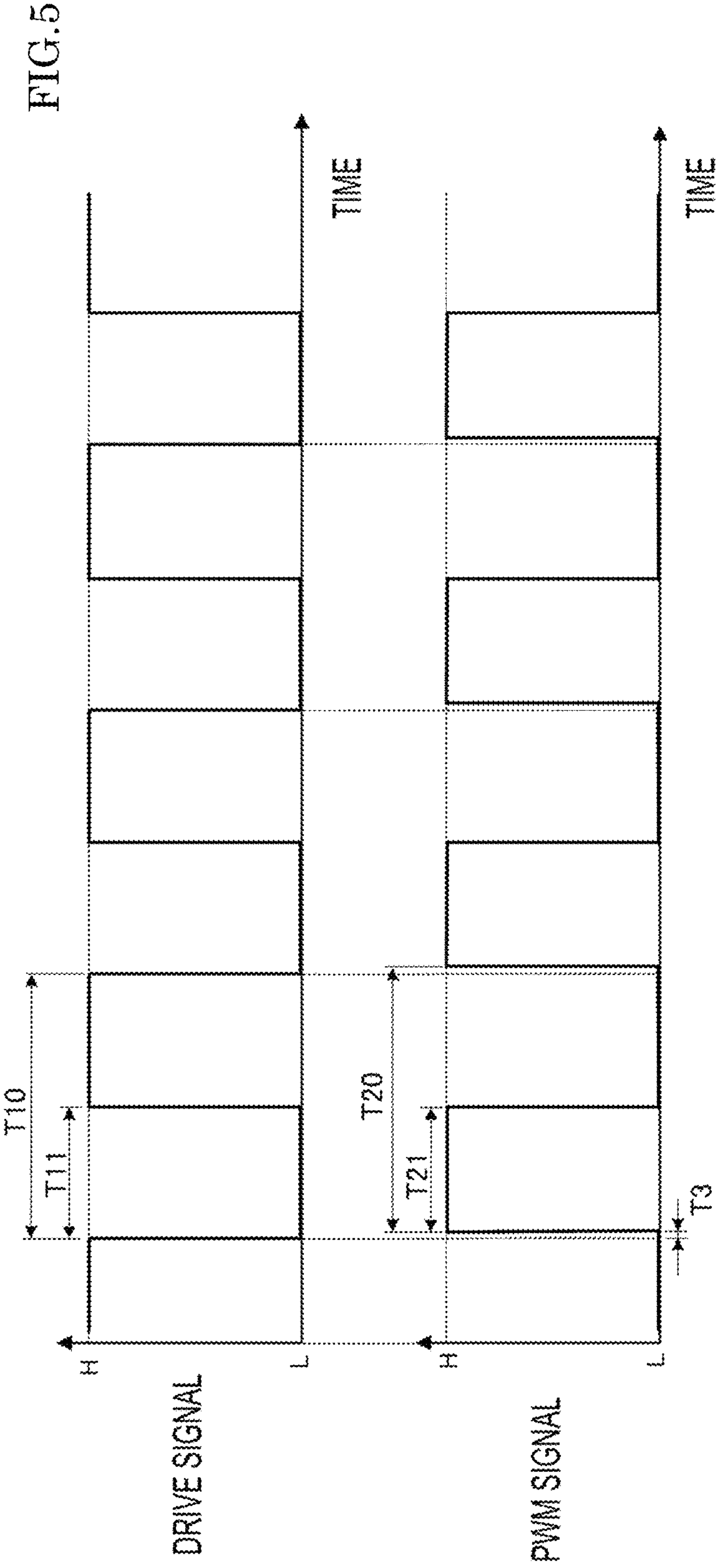
FIG. 5 is an explanatory diagram showing a relationship between a drive signal and the PWM signal in a power supply device of an image processing apparatus according to a first embodiment.

Therefore, as shown in FIG. 5, the duty ratio of the drive signal Si1 (=T11/T10), which is expressed by dividing the time width T11 of the L level of the drive signal Si1 by the period T10, naturally corresponds to the duty ratio of the PWM signal Si2 (=T21/T20). The voltage generation portion 32 generates and outputs the output voltage V1 whose magnitude (output voltage value) changes according to the duty ratio of such a PWM signal Si2.

The voltage values used by the control board 310 and the high voltage board 320 are different, and thus, as described above, the signal generation portion 31 in the control board 310 performs an open collector output. Furthermore, the switch circuit 312 such as a digital transistor has a characteristic that a delay time occurs when transitioning from ON to OFF (when turned OFF) due to a resistance component thereof. As a result, the drive signal Si1 and the PWM signal Si2 are not completely synchronized with each other, and a deviation may occur in the duty ratio between the two signals.

That is, as shown in FIG. 5, when the drive signal Si1 switches from H level to L level, due to an effect of a delay time associated with turning OFF the switch circuit 312, the rising edge of the PWM signal Si2 (switching from L level to H level) is delayed by a delay time T3. Thus, the time width T21 of the H level of the PWM signal Si2 is shorter than the time width T11 of the L level of the drive signal Si1 by the delay time T3, and the duty ratio of the PWM signal Si2 (=T21/T20) is slightly lower than the duty ratio of the drive signal Si1 (=T11/T10).

As a result of a deviation in the duty ratio between the drive signal Si1 and the PWM signal Si2, a deviation may also occur in the value of the output voltage V1 (output voltage value) output from the voltage generation portion 32. In other words, in a case in which the duty ratio of the drive signal Si1 is set according to a target output voltage value, the duty ratio of the PWM signal Si2 at that time will be lower than the target duty ratio, and the value of the output voltage V1 output from the voltage generation portion 32 will also be lower by that amount.

Therefore, by setting the duty ratio of the drive signal Si1 to a value taking into account the delay time of the switch circuit 312 (that is, a value slightly higher than the target duty ratio), the duty ratio of the PWM signal Si2 is set to the target value.

As an example, it is assumed that the frequency of the PWM signal Si2 is 10 kHz and the delay time T3 of the switch circuit 312 is 2.5 μs. In this case, the rising edge of the PWM signal Si2 is delayed by the delay time T3 relative to one period T20 (=100 μs) of the PWM signal Si2, and thus the duty ratio of the PWM signal Si2 is 2.5% lower than the duty ratio of the drive signal Si1.

In this situation, in order to make the duty ratio of the PWM signal Si2 match the target value, the control portion 311 sets the duty ratio of the drive signal Si1 to a value obtained by adding a deviation value of 2.5% to the target value. Thus, it possible to set the duty ratio of the PWM signal Si2 to the target value, and therefore makes it possible to set the output voltage value of the voltage generation portion 32 to the target value.

However, not only the duty ratio but also the frequency of the PWM signal Si2 may change. In this case, since the period T20 of the PWM signal Si2 also changes, simply setting the duty ratio of the drive signal Si1 to a value obtained by adding a predetermined deviation value to the target value may result in the duty ratio of the PWM signal Si2 deviating from the target value.

Therefore, the correction portion 33 is configured to be able to correct the duty ratio of the PWM signal Si2. That is, the duty ratio of the PWM signal Si2 generated by the signal generation portion 31 and output to the voltage generation portion 32 can be corrected by the correction portion 33. Here, the correction portion 33 finds a correction value for the duty ratio according to the frequency or period T20 of the PWM signal Si2. The correction portion 33 corrects the duty ratio of the PWM signal Si2 based on the found correction value. The "frequency" of the PWM signal Si2 referred to here is expressed as the reciprocal (1/T20) of the period T20 of the PWM signal Si2. In the present embodiment, the control portion 311 is an example of the correction portion 33.

According to this configuration, the PWM signal Si2 is corrected taking into consideration changes in the frequency (or period T20) of the PWM signal Si2, and thus, even in a case in which the frequency of the PWM signal Si2 changes, it is possible to set the duty ratio of the PWM signal Si2 to the target value. As a result, the output voltage value of the voltage generation portion 32 can be set to the target value. Moreover, in this configuration, a circuit for measuring the duty ratio of the PWM signal Si2 is not required, and thus this configuration has an advantage in that the configuration and control may be simplified more easily than in the related art.

To explain this in more detail, the correction portion 33 finds a correction value for the duty ratio based on the frequency of the PWM signal Si2 and the delay time T3 of the switch circuit 312. For example, the correction value A1 [%] is expressed by the following Equation 2 based on the frequency F1 [Hz] of the PWM signal Si2 and the delay time T3 [s] of the switch circuit 312.

$$A1 = F1 \times T3 \times 100 \qquad \text{(Equation 2)}$$

The correction portion 33 adds the correction value A1 calculated by the above Equation 2 to the target value to obtain the duty ratio of the drive signal Si1. Thus, the duty ratio of the PWM signal Si2 is corrected to the target value.

As an example, it is assumed that the frequency of the PWM signal Si2 changes from 10 KHz to 20 kHz in a case in which the delay time T3 of the switch circuit 312 is 2.5 μs as described above. In this case, the rising edge of the PWM signal Si2 is delayed by the delay time T3 relative to one period T20 (=50 μs) of the PWM signal Si2, and thus the duty ratio of the PWM signal Si2 is 5% lower than the duty ratio of the drive signal Si1. In this situation, the correction portion 33 calculates, using the above Equation 2, that the correction value A1 is 5% (=10000×0.000005×100).

The correction portion 33, by adding the correction value A1 (5%]) calculated in this manner to the target value, determines the duty ratio of the drive signal Si1. That is, the deviation in the duty ratio caused by the delay time T3 can be offset by the correction value A1, and thus the duty ratio of the PWM signal Si2 is corrected to the target value.

As described above, in the present embodiment, the correction portion 33 (control unit 311) determines the correction value A1 according to the delay time T3 caused by the switching element Tr1 of the signal generation portion 31. Therefore, in a case in which a deviation in the duty ratio occurs due to the delay time T3 inherent to the switching element Tr1 of the signal generation portion 31 that generates the PWM signal Si2, the correction portion 33 is able to make a correction taking this deviation into account.

The delay time T3 used when calculating the correction value A1 using the above Equation 2 is also not necessarily a constant value. That is, in a case in which the temperature of the switching element Tr1 changes due to the temperature characteristics of the switching element Tr1 or the like, the delay time T3 of the switch circuit 312 may also change.

Therefore, the correction portion 33 (control portion 311) uses a value for the delay time T3 that varies depending on the temperature of the switching element Tr1. That is, the correction portion 33 calculates the correction value A1 according to the above Equation 2 using the delay time T3 corresponding to the temperature of the switching element Tr1. Thus, it possible to determine a more appropriate correction value A1 taking into account the temperature of the switching element Tr1, which makes it possible to improve the accuracy of the duty ratio correction.

Figure 6:
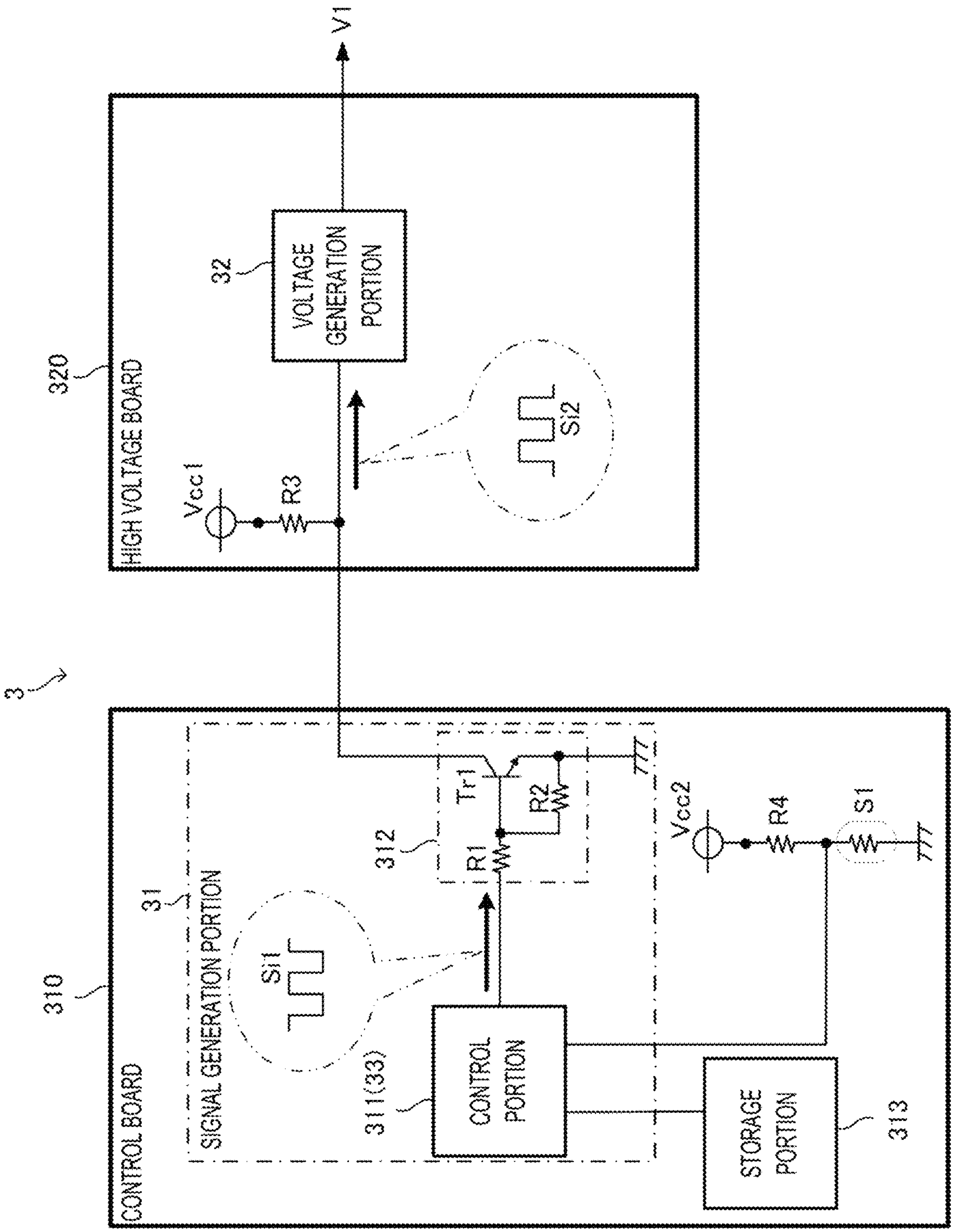
FIG. 6 is a schematic circuit diagram showing an example of a power supply device of an image processing apparatus according to a first embodiment.

Specifically, as shown in FIG. 6, the control board 310 is further provided with a storage portion 313, a constant voltage source Vcc2, a resistor R4, and a temperature sensor S1.

The storage portion 313 stores in advance information regarding the correspondence relationship between the delay time T3 and the temperature of the switching element Tr1. This information is obtained, for example, by measuring the delay time T3 of the switching element Tr1 under various temperature environments, and the measurement results are associated with each temperature and written in the storage portion 313. The information is stored in the form of a table, for example, and when a certain temperature is specified, the control portion 311 is able to read the corresponding delay time T3 from the storage portion 313.

The temperature sensor S1 is, for example, a thermistor. The temperature sensor S1 is electrically connected to a constant voltage source Vcc 2 via a resistor R4, and the voltage across both ends of the temperature sensor S1 is input to the control portion 311. In addition, the temperature sensor S1 is mounted on the control board 310 in the vicinity of the switching element Tr1 and in a state of being thermally coupled to the switching element Tr1 so as to be able to detect the temperature of the switching element Tr1.

Thus, the control portion 311 is able to detect the temperature of the switching element Tr1 based on the output (voltage across both ends) of the temperature sensor S1. The control portion 311 reads from the storage portion 313 the delay time T3 corresponding to the temperature of the switching element Tr1 indicated by the output of the temperature sensor S1. The control portion 311 calculates the correction value A1 according to the above Equation 2 using the delay time T3 read from the storage portion 313.

In short, the correction portion (control portion 311) finds the delay time T3 using the pre-stored correspondence relationship between the delay time T3 and the temperature of the switching element Tr1, and the output of the temperature sensor S1 that detects the temperature of the switching element Tr1. Thus, it possible to easily find the delay time T3 that reflects the temperature of the switching element Tr1.

Here, the temperature sensor S1 for detecting the temperature of the switching element Tr1 is not limited to a configuration for directly detecting the temperature of the switching element Tr1. For example, in a case in which there is no large difference between the ambient temperature of the switching element Tr1 and the outside air temperature around the main body 1, the temperature sensor S1 may detect the temperature of the switching element Tr1 by detecting the outside air temperature. In this case, the storage portion 313 stores the correspondence relationship between the delay time T3 and the outside air temperature as the correspondence relationship between the delay time T3 and the temperature of the switching element Tr1.

[3] Modification

The plurality of components included in the power supply device 3 may be distributed across a plurality of housings. For example, at least one of the signal generation portion 31, the voltage generation portion 32, and the correction portion 33 may be provided separately.

In addition, the specific configuration of the power supply device 3 is not limited to the configurations shown in FIGS. 4 and 6, and may be modified as appropriate as long as the same functions can be achieved. For example, the control board 310 and the high voltage board 320 may be integrated into a single board.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A power supply device, comprising:
a signal generation portion configured to generate a PWM signal;
a voltage generation portion configured to adjust an output voltage value according to the PWM signal; and
a correction portion configured to find a correction value for a duty ratio corresponding to a frequency or a period of the PWM signal, and to correct the duty ratio of the PWM signal based on the correction value.

2. The power supply device according to claim 1, wherein the correction portion finds the correction value according to a delay time due to a switching element of the signal generation portion.

3. The power supply device according to claim 2, wherein the correction portion uses, as the delay time, a value that varies depending on a temperature of the switching element.

4. The power supply device according to claim 3, wherein the correction portion finds the delay time using a pre-stored correspondence relationship between the delay time and the temperature of the switching element, and an output from a temperature sensor configured to detect the temperature of the switching element.

5. An image processing apparatus, comprising:
the power supply device according to claim 1; and
a main body including an image processing function.

* * * * *